(12) United States Patent (10) Patent No.: US 10,123,021 B2
Hiwatashi et al. (45) Date of Patent: Nov. 6, 2018

(54) IMAGE ENCODING APPARATUS FOR DETERMINING QUANTIZATION PARAMETER, IMAGE ENCODING METHOD, AND PROGRAM

(71) Applicant: CANON KABUSHIKI KAISHA, Tokyo (JP)

(72) Inventors: Saku Hiwatashi, Tokyo (JP); Koji Okawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/301,162

(22) Filed: Jun. 10, 2014

(65) Prior Publication Data

US 2014/0369617 A1 Dec. 18, 2014

(30) Foreign Application Priority Data

Jun. 13, 2013 (JP) ................................. 2013-124593

(51) Int. Cl.
*G06K 9/36* (2006.01)
*H04N 19/154* (2014.01)
(Continued)

(52) U.S. Cl.
CPC ......... *H04N 19/154* (2014.11); *H04N 19/124* (2014.11); *H04N 19/14* (2014.11); *H04N 19/176* (2014.11)

(58) Field of Classification Search
CPC .... H04N 19/154; H04N 19/14; H04N 19/176; H04N 19/124
(Continued)

(56) References Cited

U.S. PATENT DOCUMENTS

2002/0181583 A1* 12/2002 Corbera ............... H04N 19/176
375/240.03
2004/0234150 A1* 11/2004 Chang .................. H04N 19/176
382/251
(Continued)

FOREIGN PATENT DOCUMENTS

CN 101150719 A 3/2008
CN 101534444 A 9/2009
(Continued)

OTHER PUBLICATIONS

International Telecommunication Union, ITU-TH.264 (Mar. 2010), Advanced video coding for generic audio visual services; pp. 1-676.

*Primary Examiner* — Andrew Moyer
(74) *Attorney, Agent, or Firm* — Canon U.S.A., Inc. IP Division

(57) ABSTRACT

An amount of code is reduced for blocks in which visible degradation is not easily susceptible, while a large amount of code is assigned to blocks whose degradation in image quality is easily perceptible thereby suppressing the number of blocks for which a process is performed to achieve high quality image and thus suppressing an increase in the total amount of code. An input image is encoded in units of blocks. A block evaluation value for the block is calculated. The block is divided into N sub-blocks where N is equal to or greater than 2, and a sub-block evaluation value is calculated for each sub-block. A quantization parameter for the block is controlled based on the block evaluation value and the sub-block evaluation values.

30 Claims, 13 Drawing Sheets

(51) Int. Cl.
*H04N 19/176* (2014.01)
*H04N 19/124* (2014.01)
*H04N 19/14* (2014.01)

(58) Field of Classification Search
USPC .......................................................... 382/239
See application file for complete search history.

(56) References Cited

U.S. PATENT DOCUMENTS

| 2011/0002385 A1* | 1/2011 | Kobayashi ........... H04N 19/176 |
| | | 375/240.13 |
| 2011/0188575 A1* | 8/2011 | Pun et al. ................. 375/240.13 |
| 2011/0211636 A1* | 9/2011 | Yamada et al. .......... 375/240.12 |

FOREIGN PATENT DOCUMENTS

| JP | 2007-201558 A | 8/2007 |
| JP | 2007-235291 A | 9/2007 |
| JP | 2009-135902 A | 6/2009 |
| JP | 2012-109902 A | 6/2012 |
| WO | 02/080574 A1 | 10/2002 |

* cited by examiner

FIG. 10

| REGION | CONDITION |
|---|---|
| $R_1$ | $S_1<T_1[1]$ AND $S_2<T_2[1]$ |
| $R_2$ | $S_1<T_1[2]$ AND $S_2<T_2[3]$ |
| $R_3$ | $S_1<T_1[3]$ AND $S_2<T_2[1]$ |
| $R_4$ | $S_1<T_1[4]$ AND $S_2<T_2[1]$ |
| $R_5$ | $S_1<T_1[6]$ AND $S_2<T_2[1]$ |
| $R_6$ | $S_1<T_1[6]$ AND $S_2<T_2[3]$ |
| $R_7$ | $S_1<T_1[7]$ AND $S_2<T_2[4]$ |
| $R_8$ | $S_1<T_1[5]$ AND $S_2<T_2[5]$ |
| $R_9$ | $S_1<T_1[8]$ AND $S_2<T_2[6]$ |
| $R_{10}$ | $S_1<T_1[8]$ AND $S_2<T_2[7]$ |
| $R_{11}$ | $S_1<T_1[9]$ AND $S_2<T_2[6]$ |
| $R_{12}$ | $S_1<T_1[9]$ AND $S_2<T_2[7]$ |
| $R_{13}$ | $S_1<T_1[9]$ AND $S_2<T_2[8]$ |

IMAGE ENCODING APPARATUS FOR DETERMINING QUANTIZATION PARAMETER, IMAGE ENCODING METHOD, AND PROGRAM

BACKGROUND

Field of the Invention

The present invention relates to an image encoding apparatus, an image encoding method, and a program, and more particularly, to a technique of adaptively controlling an amount of code for an image.

Description of the Related Art

H.264/MPEG-4 AVC (hereinafter referred to as H.264) is known as a coding method for use in encoding a moving image into a compressed form (ITU-TH.264 (03/2010), Advanced video coding for generic audio visual services). In H.264, an image is encoded in units of blocks. In the encoding, a quantization parameter used in quantizing the image is variable from one block to another.

In a technique disclosed in International Publication No. WO 02/080574, encoding is controlled based on an index value indicating complexity or smoothness of an image to be compressed such that high image quality is achieved in a region in which an image is monotonous and smooth and thus image quality degradation due to compression is easily visually perceptible (hereinafter, such a region will be referred to as a flat region). Furthermore, in the technique disclosed in International Publication No. WO 02/080574 the encoding is controlled such that the image quality is reduced for a region in which image is complex (hereinafter, such a region will be referred to as a non-flat region). The complexity of an image is evaluated based on a difference between luminance of each pixel in a block of interest and the mean value of luminance taken over the block. In the technique disclosed in International Publication No. WO 02/080574, the image quality is optimized by adaptively controlling the image quality in the above-described manner.

Furthermore, in the technique disclosed in International Publication No. WO 02/080574, each block is divided into sub-blocks, and an index value for the judgment on the flat region is determined for each of the sub-blocks thereby making it possible to detect a flat region even in a case where the block includes both a flat region and a non-flat region.

Referring to FIG. 6, controlling the image quality based on the flat region judgment according to the technique disclosed in International Publication No. WO 02/080574 is described below. FIG. 6 illustrates an image including a black object in a white background, in which squares represented by solid lines denote blocks each including 16×16 pixels. Reference numeral 601 denotes one of blocks (white blocks) in the white background. All pixels in this block have a similar large pixel value, and thus the complexity of this block is low. Reference numeral 603 denotes one of blocks (black blocks) of the black object. In this block, all pixels have a small pixel value, and thus the complexity of this block is low. Reference numeral 602 denotes a block located on a boundary between a white block and a black block. The block 602 includes both black and white pixels, and thus there is a large difference between the luminance of each pixel and the mean value of the luminance of the block, and therefore the complexity of this block is high. Therefore, in a case where the judgment of the flat region is performed simply based on the complexity of each block and the quantization parameter is determined based on the result of the judgment, the quantization parameter for blocks with high complexity is set to be large. However, in blocks located on a boundary as with the block 602, image quality degradation is, in general, easily perceptible, and thus it may be desirable to set the quantization parameter to be small.

If each block is divided into a sub-block each including 8×8 pixels as represented by broken lines in FIG. 6, then all pixels in two sub-blocks in the block 602 are black while all pixels in the other two sub-blocks in the block 602 are white. That is, when the complexity is evaluated in units of sub-blocks, the complexity is similar to either that of the block 601 or the block 603. By determining the complexity in units of sub-blocks in the above-described manner, it becomes possible to determine more precisely whether blocks are on a boundary and thus degradation in image quality is easily susceptible, and thus it becomes possible to suppress degradation in image quality that would otherwise occur due to setting the quantization parameter to a large value.

However, in the technique disclosed in International Publication No. WO 02/080574, the index value for detecting flat regions is calculated as many times as there are sub-blocks, which results in an increase in calculation cost. Furthermore, in the technique disclosed in International Publication No. WO 02/080574, any block including a sub-block determined to be a flat region is encoded such that high image quality is obtained, which results in an increase in the number of blocks that are processed so as to obtain high image quality. In this case, encoding flat regions so as to have high image quality results in an increase in the total amount of code, which means that in a case the amount of code is limited, it is difficult to achieve high image quality for flat regions.

In the following, referring to FIG. 11 and FIG. 12, problems with controlling image quality in the technique disclosed in International Publication No. WO 02/080574 are described. In FIG. 11, blocks 1101 to 1107 are arranged according to the complexity determined in units of blocks. Each block is evaluated based on its complexity in terms of whether it is a flat region, and the quantization parameter therefor is determined. FIG. 12 illustrates a result obtained in a case where classifying and determination of the quantization parameter are performed based on the complexity for each of four sub-blocks into which each block is divided. In the case where the complexity is determined in units of sub-blocks, pixels of any sub-block except for sub-blocks in the block 1105 are equal in pixel value within the sub-block, and thus the complexity is low. That is, the number of blocks determined to be a flat region increases, and thus the quantization parameter is set to be low to achieve high image quality in encoding. As a result, the total amount of code increases.

SUMMARY

The disclosure provides a technique of reducing the amount of code for blocks whose degradation in image quality is not easily perceptible, while a large amount of code is assigned to blocks whose degradation in image quality is easily perceptible. Furthermore, the number of blocks processed so as to achieve high quality image is suppressed thereby preventing an increase in the total amount of code.

An image encoding apparatus according to an embodiment includes an evaluation unit configured to determine an evaluation value of a block with a predetermined size in an image frame based on image data corresponding to the block and determine evaluation values of a plurality of sub-blocks divided from the block based on image data corresponding to the plurality of sub-blocks, and a determination unit configured to determine an encoding parameter for use in encoding the image data corresponding to the block based on the evaluation value of the block and the evaluation values of the plurality of sub-blocks.

Further features of the present invention will become apparent from the following description of exemplary embodiments with reference to the attached drawings.

BRIEF DESCRIPTION OF THE DRAWINGS

FIG. 10 is a diagram illustrating a manner in which regions are defined by evaluation values according to the fifth embodiment.

DESCRIPTION OF THE EMBODIMENTS

Referring to the accompanying drawings, example embodiments of the invention are described in detail below. Note that the examples described below are only by way of example, and the invention is not limited to the examples described below.

First Embodiment

Figure 1:
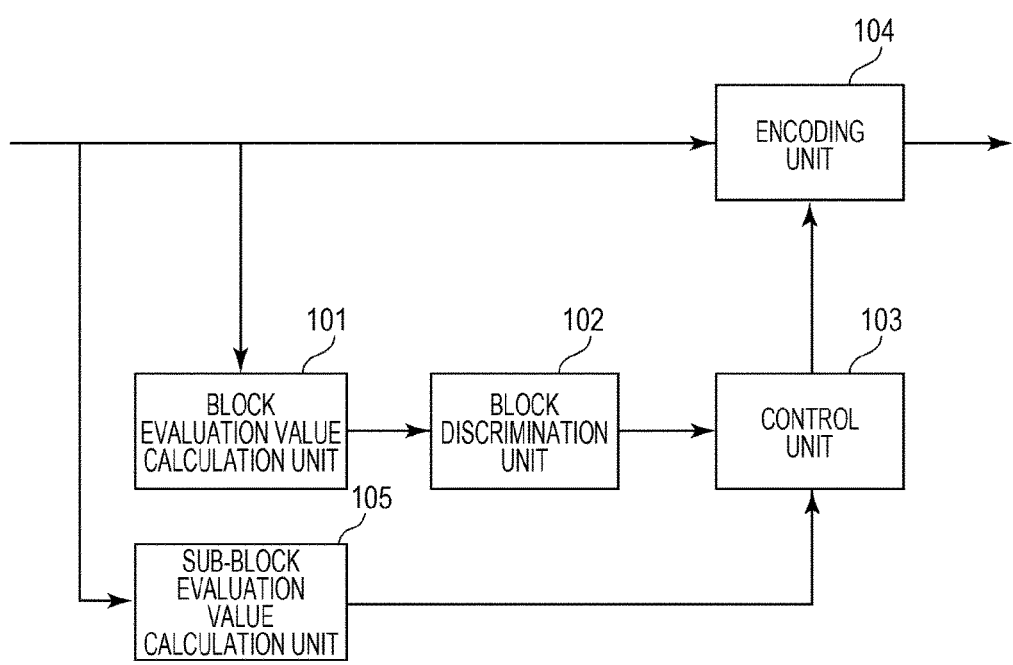
FIG. 1 is a block diagram illustrating a configuration of an image encoding apparatus according to a first embodiment.

In the following, a first embodiment of the invention is described with reference to drawings. FIG. 1 is a block diagram illustrating an image encoding apparatus according to the first embodiment.

In FIG. 1, reference numeral 101 denotes a block evaluation value calculation unit configured to calculate evaluation values of an input image. An image is input to the block evaluation value calculation unit 101 in units of blocks, and the block evaluation value calculation unit 101 calculates block evaluation values of each block. Reference numeral 102 denotes a block discrimination unit configured to generate block discrimination information based on a plurality of block evaluation values. Reference numeral 103 denotes a control unit configured to determine a quantization parameter for a block based on the block discrimination information. Reference numeral 104 denotes an encoding unit configured to encode an input image. An image is input to the encoding unit 104 in units of blocks, and the encoding unit 104 decodes the block based on the quantization parameter generated by the control unit 103 thereby generating an encoded data stream. The sub-block evaluation value calculation unit 105 receives an input of an image in units of blocks. The sub-block evaluation value calculation unit 105 divides each block into a plurality of sub-blocks, and calculates sub-block evaluation values for each sub-block.

An operation of the image encoding apparatus is described in detail below with reference to a flow chart illustrated in FIG. 2. In the present embodiment, moving image data is input in units of frames, and each frame is divided into blocks and is processed in raster scan order. However, the present embodiment is not limited to this. For example, each frame may be divided in slices, and an image may be input in units of slices. Furthermore, in the present embodiment, each block is assumed to have a size of 16×16 pixels. However, the present embodiment is not limited to this. For example, the block size may be 8×8 pixels, 32×32 pixels, 32×16 pixels, or the like.

In step S201, the block evaluation value calculation unit 101 calculates block evaluation values of an input block. The block evaluation values are image quality index values obtained when a block of interest is encoded. Here, the image quality index indicates a degree to which a quantization error in encoding a block affects human vision. The evaluation values are calculated to determine this degree. In the present embodiment, the mean value of luminance of pixels within a block and complexity of luminance of the block are calculated as block evaluation values. The complexity of luminance is given by the sum of values (absolute values) of difference between the luminance values of respective pixels belonging to the block and the mean value of the luminance of the block. However, the image encoding apparatus according to the present embodiment is not limited to this, but any index may be employed that represents the degree to which the quantization error affects human vision. For example, the variance of luminance, or the mean value, the complexity, the variance or the like of color difference may be calculated, or an encoding result such as a motion vector, a prediction error, or the like may be used as the index. Furthermore, the number of types of block evaluation value calculated is not limited to two, but, other block evaluation values such as the mean value of color difference may be calculated in addition to the mean value of luminance and the complexity.

Furthermore, in step S201, the sub-block evaluation value calculation unit 105 divides the input block into a plurality of sub-blocks, and calculates sub-block evaluation values. As with the block evaluation values, the sub-block evaluation values are image quality index values obtained when a sub-block of interest is encoded. In the present embodiment, the complexity of luminance is given by the sum of values (absolute values) of difference between the luminance values of respective pixels belonging to the sub-block of interest and the mean value of the luminance of the sub-block. Furthermore, in the present embodiment, after the complexity of luminance is determined for each sub-block, the minimum value thereof is calculated as the sub-block evaluation value. Note that the method of the sub-block evaluation values in the image encoding apparatus according to the present embodiment is not limited to the above. It may be allowed to use any index that indicates a degree to which human vision is affected, and the index is not limited to the minimum value of each sub-block.

In step S202, the block discrimination unit 102 generates block discrimination information for the block of interest based on the block evaluation values. Details of the method of generating the block discrimination information will be described later.

In step S203, the control unit 103 generates a quantization parameter depending on the attribute of the block, based on the sub-block evaluation values and the block discrimination information. Details of the method of generating the quantization parameter will be described later.

In step S204, the encoding unit 104 encodes the block based on the quantization parameter thereby generating an encoded data stream.

In step S205, it is determined whether the encoding is completed for all blocks in the frame. In a case where the encoding is completed for all blocks (Yes in step S205), the process of encoding the frame is ended. On the other hand, in a case where the encoding is not completed for all blocks (No in step S205), the processing flow proceeds to step S201 to encode a next block.

Figure 7:
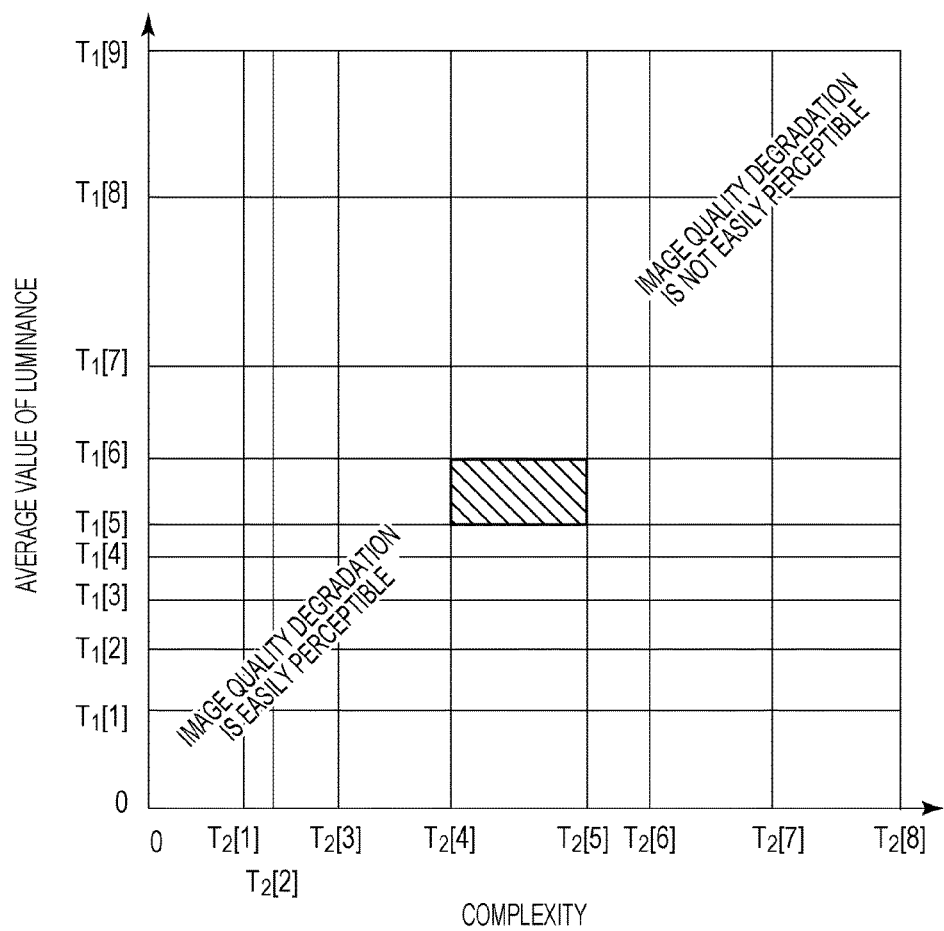
FIG. 7 is a diagram illustrating a manner in which blocks are discriminated according to the first embodiment.

The method of generating the block discrimination information (in step S202) according to the present embodiment is described in detail below. In the present embodiment, two block evaluation values, one of which indicates the mean value $S_1$ of luminance taken over the block and the other one indicates the complexity $S_2$ of luminance, are used in generating the block discrimination information. Furthermore, threshold value arrays $T_1$ and $T_2$ are defined for the respective evaluation values $S_1$ and $S_2$. Note that one threshold value array $T_1$ is defined and stored for corresponding one of k evaluation values $S_1, S_2, \ldots, Sk$. FIG. 7 illustrates an example of a manner in which blocks are discriminated according to the mean value of luminance and the complexity. A horizontal axis represents complexity $S_2$, and a vertical axis represents the mean value of luminance $S_1$. As a result of the discrimination, the block is classified into one of 72 regions. $T_1$ and $T_2$ each include a set of threshold values that define the regions. In the example illustrated in FIG. 7, $T_1=\{T_1[1], T_1[2], T_1[3], T_1[4], T_1[5], T_1[6], T_1[7], T_1[8], T_1[9]\}$, and $T_2=\{T_2[1], T_2[2], T_2[3], T_2[4], T_2[5], T_2[6], T_2[7], T_2[8]\}$. The block discrimination information P is represented by a set of threshold values that define a region to which the evaluation values of the block of interest belong. For example, in the example illustrated in FIG. 7, block discrimination information P for a shaded region is $P=\{T_1[6], T_2[5]\}$.

Figure 3:
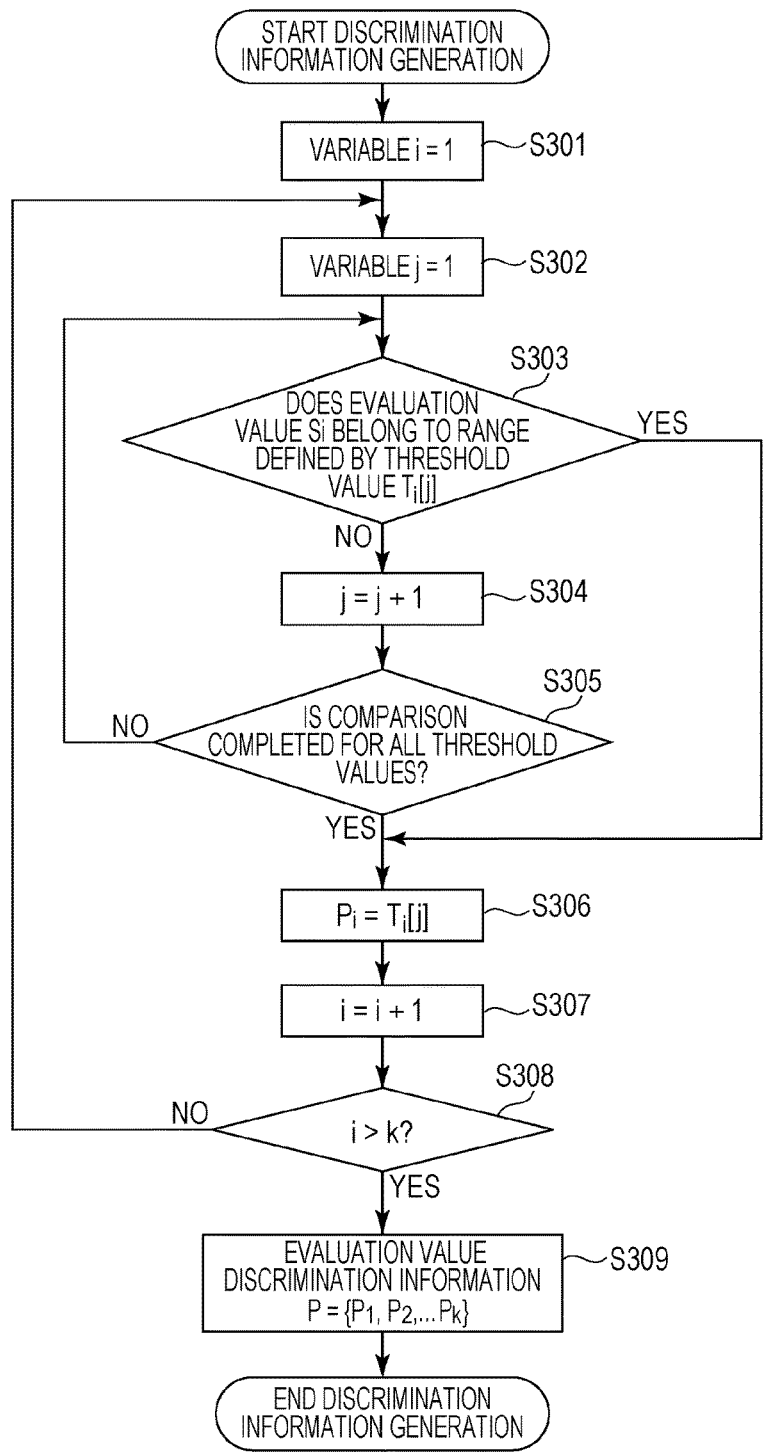
FIG. 3 is a flow chart of a process of generating block discrimination information according to the first embodiment.

Referring to a flow chart illustrated in FIG. 3, a method of generating block discrimination information (in step S202) is described in detail below. First, in step S301, a variable i is initialized to 1, and in step S302, a variable j is initialized to 1. Next, in step S303, it is determined whether an evaluation value $S_i$ belongs to a region defined by a threshold value $T_i[j]$. In a case where the evaluation value $S_i$ belongs to the region defined by the threshold value $T_i[j]$ (Yes in step S303), the processing flow proceeds to step S306, but otherwise the processing flow proceeds to step S304. In step S304, the variable is incremented by 1.

Next, in step S305, it is determined whether the evaluation value $S_i$ has been compared with all threshold values (all threshold values belonging to the threshold value array $T_i$). In a case where the comparison is completed for all threshold values (Yes in step S305), the processing flow proceeds to step S306, but otherwise the processing flow proceeds to step S303. In step S306, the threshold value of the region into which the evaluation value $S_i$ is classified is substituted into the block discrimination information $P_i$ (into an i-th element of the block discrimination information P) for the evaluation value $S_i$, and the processing flow proceeds to step S307. In step S307, the variable i is incremented by 1, and the processing flow proceeds to step S308. In step S308, it is determined whether the variable is larger than k, that is, whether the comparison with threshold values is completed for all k evaluation values. In a case where the comparison is completed for all k evaluation values (Yes in step S308), the processing flow proceeds to step S309 but otherwise (No in step S308), the processing flow proceeds to step S302.

In step S309, a set of threshold values in which the respective evaluation values are classified is substituted in the block discrimination information P, and the process of generating the block discrimination information is ended. The block discrimination information generated in the above-described manner indicates the location of the lattice region of FIG. 7 in which the block of interest is classified in terms of the evaluation value. An attribute is defined to each block discrimination information and a quantization parameter optimum for the attribute is defined to the block discrimination information.

In the present embodiment, the generated block discrimination information is used in determining the degree of degradation in image quality of the block of interest. For example, human eyes are more sensitive to degradation in image quality of an image with a low spatial frequency than to that with a high spatial frequency. Blocks with low complexity are low in the spatial frequency, and thus, in such blocks, degradation in image quality due to a quantization error is easily perceptible by human eyes. On the other hand, blocks with high complexity have high spatial frequency, and degradation in image quality is not easily perceptible in such blocks. Regarding the mean value of luminance, like the complexity, degradation in image quality in dark regions is easily perceptible by human eyes, while degradation in image quality in bright regions is not easily perceptible by human eyes. Based on the plurality of these evaluation values, the quantization parameter is determined, for example, such that the quantization parameter for regions close to the bottom left of the graph of FIG. 7 is set to be small to suppress the degradation in image quality. On the other hand, the quantization parameter is set to be large for regions close to the top right of the graph of FIG. 7 because degradation in image quality is not easily perceptible thereby suppressing an increase in the total amount of code. Thus it is possible to increase image quality susceptible by human eyes while substantially maintaining the bit rate.

Figure 4:
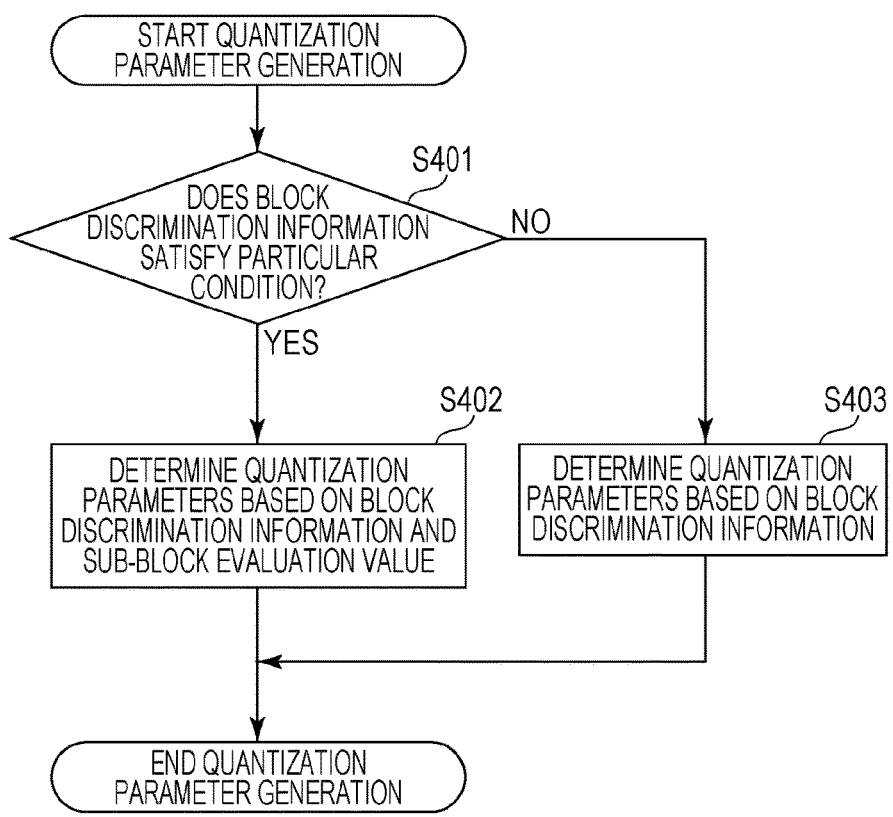
FIG. 4 is a flow chart of a process of generating a quantization parameter according to the present invention.

Next, referring to a flow chart illustrated in FIG. 4, a method of generating a quantization parameter (in step S203) is described in detail. First, in step S401, it is determined whether the block discrimination information generated in step S202 satisfies a particular condition. In a case where the particular condition is satisfied (Yes in step S401), then in step S402, a quantization parameter optimum for the characteristic of the sub-block is determined based on the sub-block evaluation value.

Herein, when the particular condition is satisfied, this means that as a result of the determination of block discrimination information based on the image quality index in units of blocks, it is determined that the evaluation of the image quality index is to be performed on the in units of sub-blocks. This occurs, for example, when it is determined that the block of interest is in a region in the upper right area of FIG. 7 (that is, the mean value of luminance of pixels in the block of interest is equal to or greater than a first threshold value and the complexity of luminance is equal to or greater than a second threshold value), that is, when it is determined that the block of interest is in such a region in which degradation in image quality is not easily susceptible and thus it may be allowed to employ a large quantization parameter. However, even in a case where it is determined that it is allowed to employ a large quantization parameter for a particular block, there is a possibility that the block includes a flat sub-block such as that described above and thus if a large quantization parameter is used, easily susceptible degradation in image quality may occur.

To avoid the above situation, in step S402, the quantization parameter is generated based on the sub-block evaluation value. In a case where it is determined in step S401 that the particular condition is not satisfied (No in step S401), that is, in a case where it is determined the evaluation on the block of interest indicates that easily susceptible degradation in image quality occurs, the processing flow proceeds to step S403. In step S403, the quantization parameter is generated without using the sub-block evaluation value.

There is not particular restriction on the method of generating the quantization parameter in step S402 or step S403. For example, a quantization parameter is retrieved from a lookup table or the like in which a one-to-one correspondence between the block discrimination result and the quantization parameter is described.

In the process in step S402 or step S403, the amount of code is reduced for blocks in which visible degradation is not large while a large amount of code is assigned to blocks in which degradation is easily perceptible thereby achieving high image quality and thus improving visibly perceptible image quality. Furthermore, by performing the evaluation in units of sub-blocks only for part of blocks, it is possible to suppress the increase in the number of blocks for which the process of achieving high image quality is performed.

In the present embodiment, by way of example, two types of evaluation indexes, that is, the mean value of luminance and the complexity are used as evaluation indexes of the block discrimination information, and the quantization parameter is set based on the location in the two-dimensional space of evaluation indexes. Note that the types of evaluation values may be increased to k types (k>2) and the space may be extended to a k-dimensional space.

Second Embodiment

An image encoding apparatus according to a second embodiment is described below. In this second embodiment, a configuration of the image encoding apparatus is the same as that of the image encoding apparatus according to the first embodiment illustrated in FIG. 1. In the present embodiment, of the operation processes of the image encoding apparatus illustrated in the flow chart illustrated in FIG. 2, the process of calculating block evaluation values (in step S201) is different from that in the first embodiment.

In step S201, the block evaluation value calculation unit 101 calculates the block evaluation values of an input block. In addition to the block evaluation values described in the first embodiment, an index value is obtained for each of M sub-blocks into which the block is further divided, where M is an integer equal to or smaller than N, and a smallest value of a plurality of index values obtained is employed as a block evaluation value. In the present embodiment, the variance of pixel values is calculated for each sub-block, and the smallest value of a plurality of variances is selected as the index value. However, the index in the present embodiment is not limited to this. Furthermore, in step S201, the sub-block evaluation value calculation unit 105 divides the input block into N sub-blocks and calculates the sub-block evaluation values. The other operation processes of the sub-block evaluation value calculation unit are similar to those according to the first embodiment described above.

The process in step S202 and following steps are similar to those according to the first embodiment described above, and thus a further description thereof is omitted. Furthermore, the method of generating the block discrimination information in step S202 in the flow chart illustrated in FIG. 3 and the method of generating the quantization parameter in step S203 in the flow chart illustrated in FIG. 4 are similar to those according to the first embodiment, and thus a further description thereof is omitted.

Figure 5:
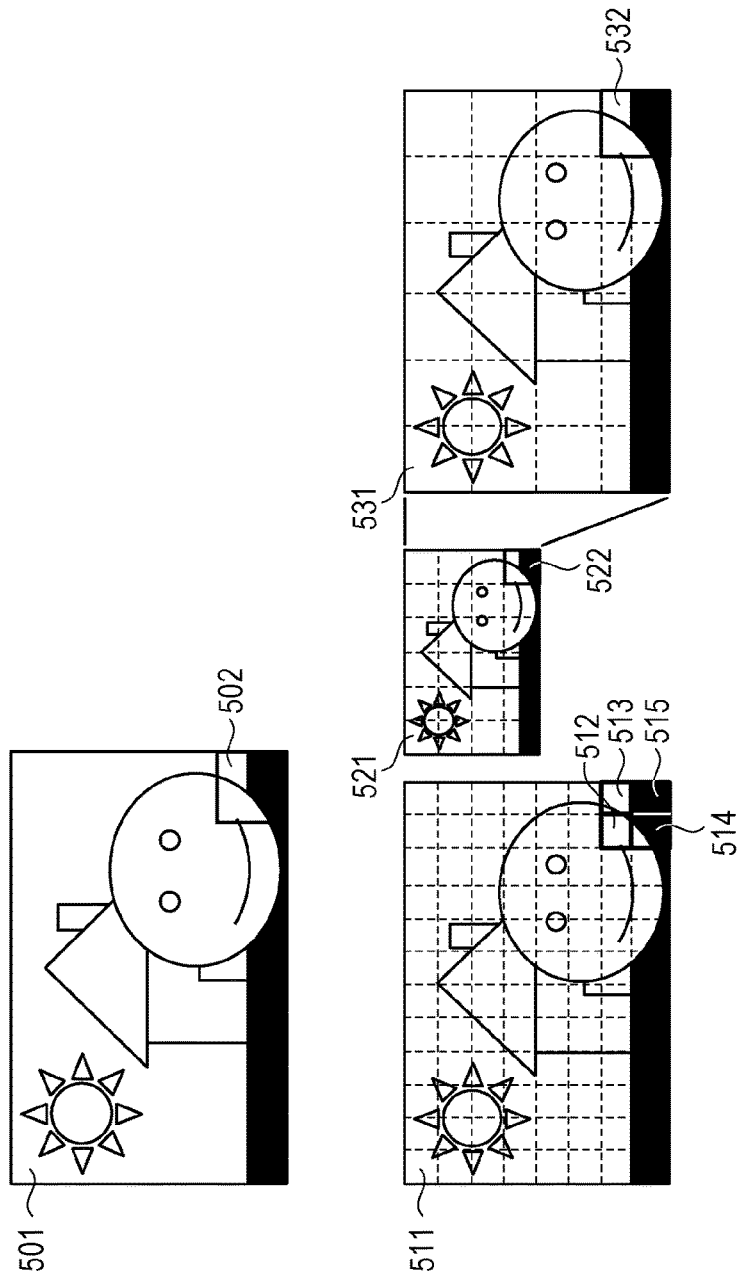
FIG. 5 is a diagram illustrating a manner of controlling image quality depending on a block size according to a second embodiment.
Figure 6:
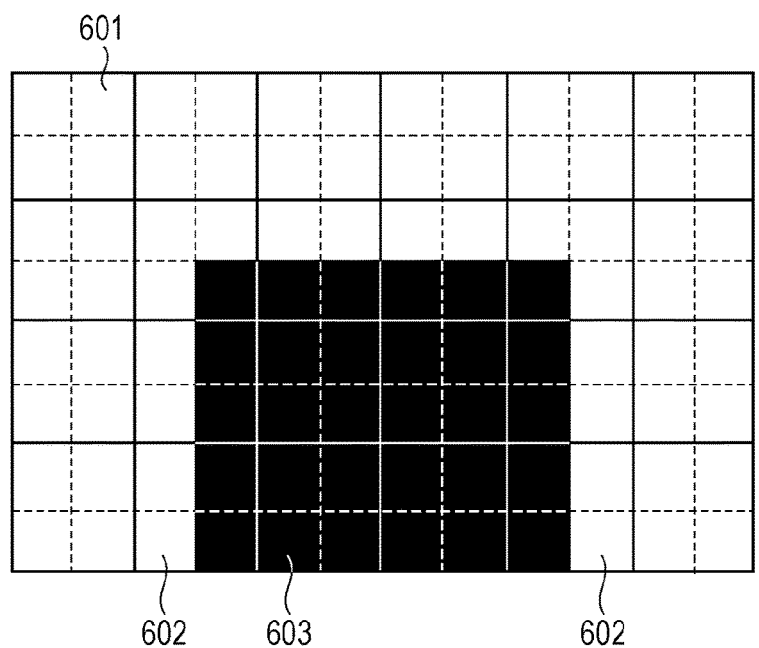
FIG. 6 is a diagram illustrating an object and sub-blocks according to a related technique.

As described above, by calculating the evaluation values for part or all of blocks from index values of M sub-blocks into which the block is divided, that is, by changing the size of the block used in the calculation of the evaluation index, it becomes possible to control the image quality depending on the input image. Referring to FIG. 5, a description is given below as to a manner in which image quality is controlled depending on a block size used in the calculation of the evaluation index.

In FIG. 5, reference numeral 501 denotes a scene whose image is to be taken, and reference numeral 502 denotes a subregion of the scene. In the following, a discussion is given on visible degradation in image quality at a boundary between white and black parts in a flat area in the subregion 502. Reference numeral 511 denotes a result of block encoding in which the scene 501 is divided into 12 (horizontal)×8 (vertical) blocks which are represented by broken lines. Hereinafter, this encoding result will be referred to as an encoding result A. The subregion 502 includes four blocks 512, 513, 514, and 515 subjected to encoding. In a block encoding result 521, the subject 501 is divided into 6 (horizontal)×4 (vertical) blocks subjected to the encoding, that is, the number of blocks is reduced to one-half in each of the vertical and horizontal directions, as represented by broken lines. Hereinafter, this encoding result is referred to the encoding result B. The subregion 502 is encoded by a block 522. Herein, it is assumed that the size of each block (the number of pixels included in the block) is the same between the encoding result A and the encoding result B. In the case of a block encoding result 531 and a block 532, the block size of the encoding result B is extended by a factor of 2 in both the horizontal and vertical directions such that the size of the reproduced image of the scene is similar to that of the encoding result A.

In both the encoding results A and B, in a case where the flat region judgment is performed in units of blocks, in the encoding result A, a part (in which all pixels are black) of the block 515 in the subregion is judged as a flat region just by the complexity of luminance, and, in response, a proper control of image quality is performed. In the case of the blocks 512 and 513, a majority of pixels of these blocks are white, and thus these blocks are also judged as flat regions. However, in the encoding result B, the subregion is given by one block, and thus it is difficult to judge, only from the complexity of luminance in units of blocks, that the blocks 512 and 513 are flat regions. That is, when the encoding result A and the encoding result B are viewed for the same size, the difference in the control of the image quality in the subregion between the encoding result A and the encoding result B may cause degradation in visual image quality to be easily perceptible in the encoding result B. Therefore, to control the image quality so as to achieve the image quality in the encoding result B similar to that of the encoding result A, it may be desirable to reduce the size of blocks (sub-blocks) for which the evaluation index is calculated.

In many encoding methods including H.264, the size of blocks used as units of encoding is specified to a fixed value, and thus the number of divided blocks is proportional to the size of the image. That is, the number of divided blocks increases with the image size, and the scene is divided into a greater number of blocks. From the above discussion, to effectively suppress the degradation in visual image quality, it may be desirable to change, depending on the image size, the size of blocks (sub-blocks) for which the evaluation index is calculated.

Third Embodiment

Figure 8:
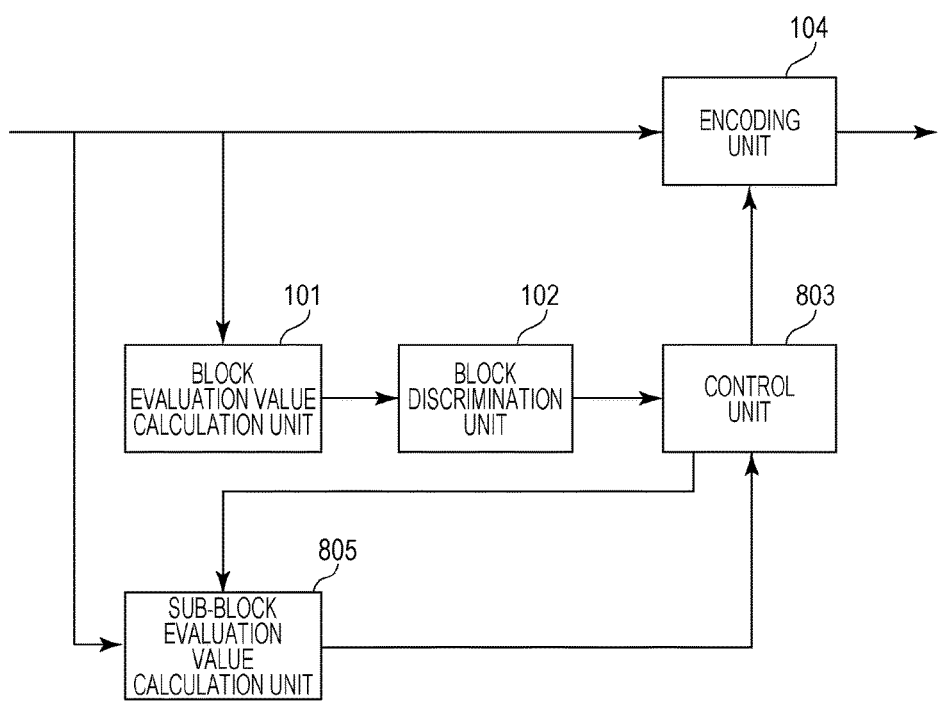
FIG. 8 is a block diagram illustrating a configuration of an image encoding apparatus according to a third embodiment.
Figure 9:
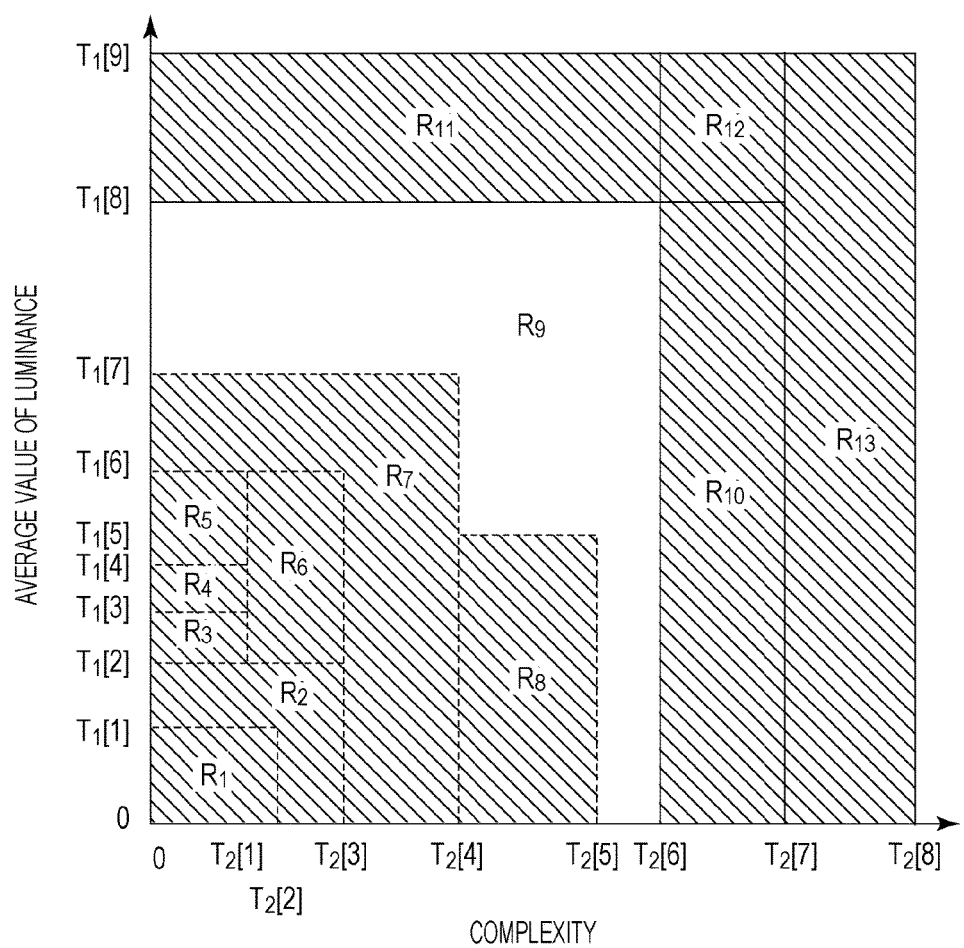
FIG. 9 is a diagram illustrating a manner in which blocks are discriminated according to a fifth embodiment.
Figure 11:
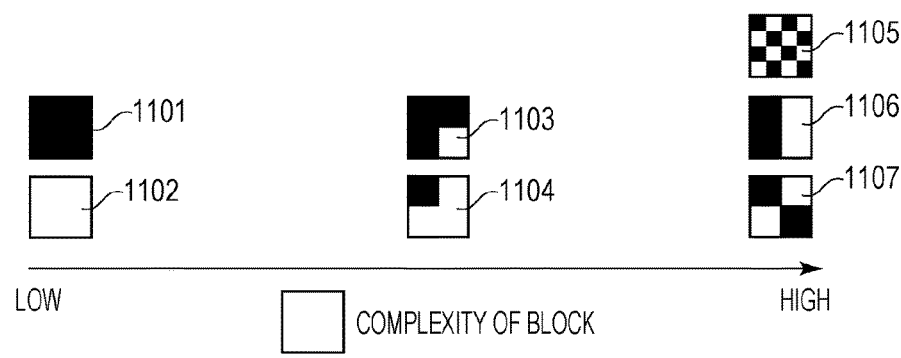
FIG. 11 is a diagram illustrating a manner in which blocks are classified by complexity of blocks according to a related technique.
Figure 12:
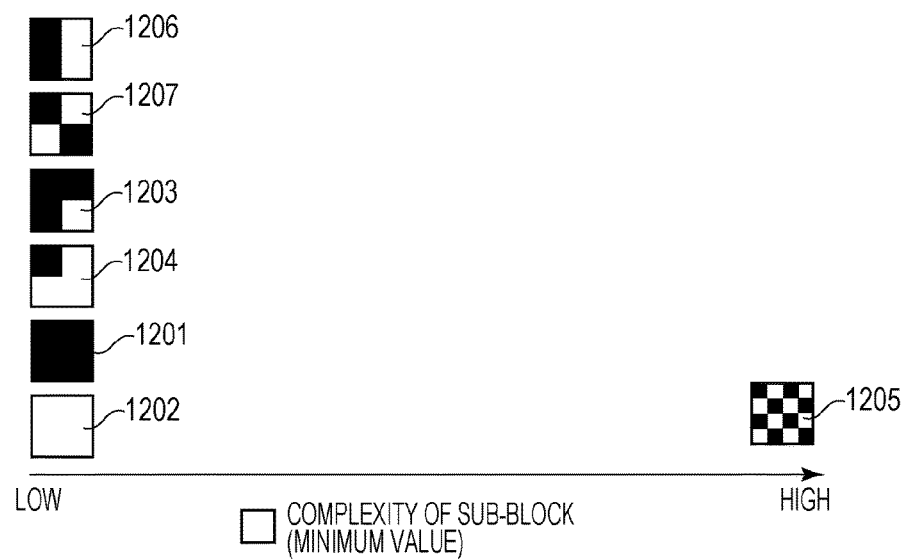
FIG. 12 is a diagram illustrating a manner in which blocks are classified by complexity of sub-blocks according to a related technique.

An image encoding apparatus according to a third embodiment is described below with reference to a block diagram illustrated in FIG. 8. In FIG. 8, units 101, 102, and 104 are similar in function to the units 101, 102, and 104 illustrated in FIG. 1, and thus a further description thereof is omitted.

Reference numeral 803 denotes a control unit configured to determine a quantization parameter for a block based on block discrimination information. Reference numeral 805 denotes a sub-block evaluation value calculation unit configured to receive an input of an image in units of blocks, divide each block into a plurality of sub-blocks, and calculate sub-block evaluation values for each sub-block. Unlike the control unit 103 according to the first embodiment, the control unit 803 according to the present embodiment makes a determination, based on the block discrimination information, as to whether to calculate the sub-block evaluation values and informs the sub-block evaluation value calculation unit 805 of a determination result. Based on the informed determination result, the sub-block evaluation value calculation unit 805 calculates the sub-block evaluation values.

Figure 13:
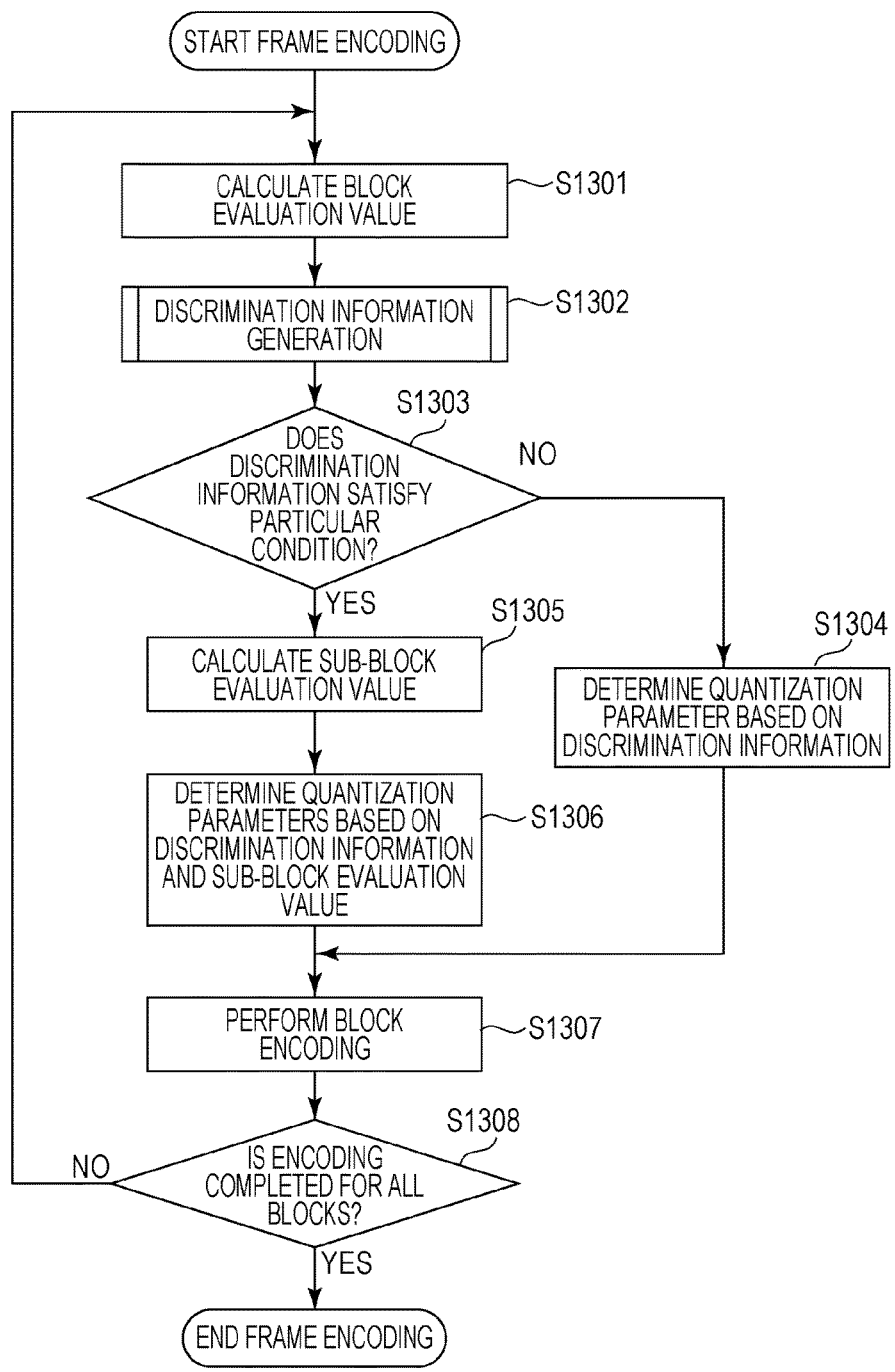
FIG. 13 is a flow chart of frame encoding according to the third embodiment.

Referring to a flow chart illustrated in FIG. 13, an operation of the image encoding apparatus according to the present embodiment is described in detail. In FIG. 13, in step S1301, the block evaluation value calculation unit 801 calculates block evaluation values of an input block. As in the first embodiment, the block evaluation values are image quality index values obtained when a block of interest is encoded. In the present embodiment, the mean value of luminance of pixels taken over a block and complexity of luminance are calculated as block evaluation values. The complexity of luminance is given by the sum of values (absolute values) of difference between the luminance values of respective pixels belonging to the block and the mean value of the luminance of the block.

In step S1301, unlike step S201 according to the first embodiment, sub-block evaluation values are not calculated, but in the present embodiment, sub-block evaluation values are calculated in step S1305 described later.

Figure 2:
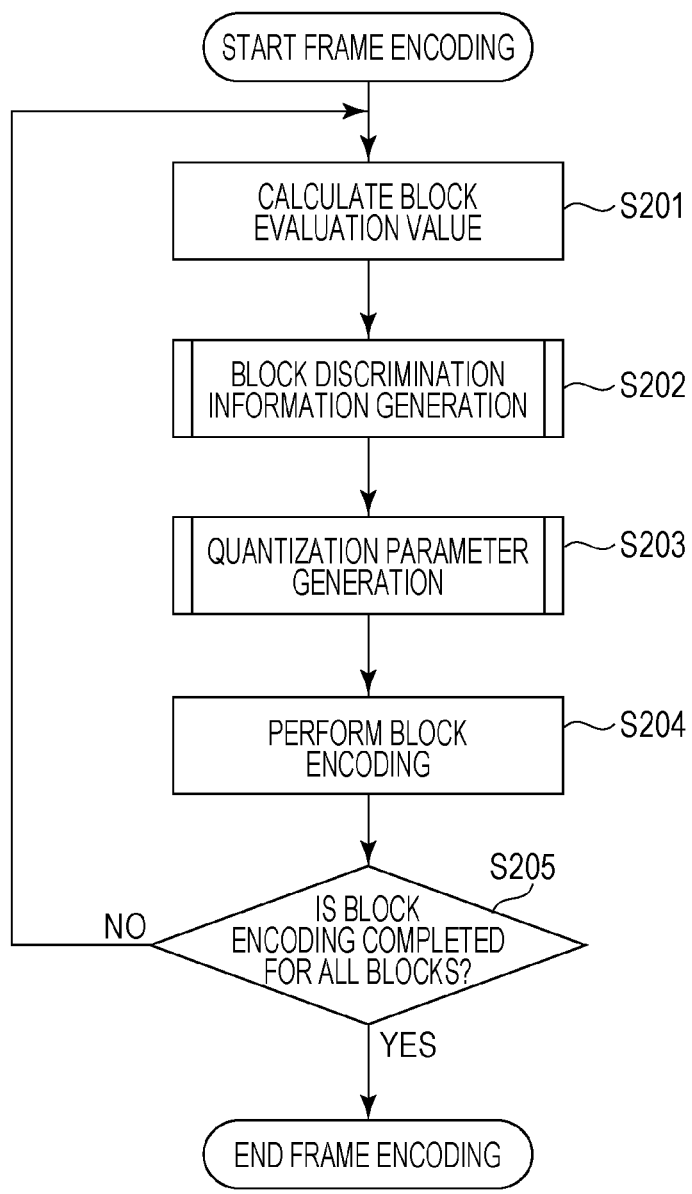
FIG. 2 is a flow chart of frame encoding according to the first embodiment.

Step S1302 is similar to step S202 in FIG. 2, and thus a description thereof is omitted. Next, in step S1303, the control unit 803 determines whether the discrimination information satisfies a particular condition. In a case where the particular condition is satisfied (Yes in step S1303), the processing flow proceeds to step S1305, but otherwise the processing flow proceeds to step S1304. Herein, as in step S401 according to the first embodiment, the particular condition is satisfied when as a result of the determination of block discrimination information based on the image quality index in units of blocks, it is determined that the evaluation of the image quality index is to be performed in units of sub-blocks.

In step S1304, because it has been determined that evaluation of image quality indexes in units sub-blocks is not to be performed, a quantization parameter is generated only based on the block evaluation values calculated in step S1301. On the other hand, in step S1305, because it has been determined that evaluation of image quality indexes in units sub-blocks is to be performed, the sub-block evaluation value calculation unit 805 calculates the sub-block evaluation values. The sub-block evaluation values are similar to those according to the first embodiment, and thus a further description thereof is omitted.

Next, step S1306 and step S1307 are performed. These steps are similar to step S402 in FIG. 4 and step S204 in FIG. 2, respectively, and thus a further description thereof is omitted.

Next, in step S1307, it is determined whether encoding is completed for all blocks in a frame. In a case where the encoding is completed for all blocks (Yes in step S1307), the encoding process for the frame is ended, but otherwise the processing flow returns to step S1301 to encode a next block.

In the present embodiment, unlike the first embodiment, only in a case where discrimination information satisfies a particular condition, sub-block index values are generated in step S1304. In a case where the discrimination information does not satisfy the particular condition, sub-block index values are not used in determining the quantization parameter. Therefore, it will be redundant to always calculate sub-block index values. In the present embodiment, the sub-block evaluation value calculation unit 805 is operated only when determination of a quantization parameter is to be performed, and thus a reduction in power consumption is achieved compared with the first embodiment.

Fourth Embodiment

An image encoding apparatus according to a fourth embodiment is described below. In this fourth embodiment, a configuration of the image encoding apparatus is the same as that of the image encoding apparatus according to the third embodiment illustrated in FIG. 8. In the present embodiment, of the operation processes of the image encoding apparatus illustrated in the flow chart illustrated in FIG. 13, the process of calculating the block evaluation values (in step S1301) is different from that in the third embodiment.

In step S1301, the block evaluation value calculation unit 801 calculates block evaluation values of an input block. As for the index values used as the block evaluation values, in addition to those employed in the third embodiment, an index value is determined as follows. That is, a block of interest is further divided into M sub-blocks where M is an integer equal to or greater than 2, and index values are determined for the respective sub-blocks and a minimum value of all index values obtained is employed as a block evaluation value.

In the present embodiment, by way of example but not limitation, the variance of pixel values is acquired for each of the sub-blocks, and a smallest one of the acquired variances is selected as the index value. In step S1305, the sub-block evaluation value calculation unit 805 divides an input block into N sub-blocks where N is an integer greater than M, and calculates sub-block evaluation values. The other operation processes of the sub-block evaluation value calculation unit 805 are similar to those according to the third embodiment described above. The process in step S1302 and the following processes are similar to those according to the third embodiment described above, and thus a further description thereof is omitted.

By calculating part or all of the block evaluation values from index values calculated for the respective sub-blocks, that is, by changing the block size used in calculating the evaluation index values, it becomes possible to control the image quality depending on the input image.

In the present embodiment, unlike the second embodiment, only in a case where the discrimination information satisfies the particular condition, sub-block index values are generated in step S1304. In a case where the discrimination information does not satisfy the particular condition, sub-block index values are not used in determining the quantization parameter. Therefore, it is redundant to always calculate sub-block index values. In the present embodiment, the sub-block evaluation value calculation unit 805 is operated only when determination of a quantization parameter is to be performed, and thus a reduction in power consumption is achieved compared with the second embodiment.

Fifth Embodiment

An image encoding apparatus according to a fifth embodiment is described below. In this fifth embodiment, a configuration of the image encoding apparatus is the same as that of the image encoding apparatus according to the first embodiment illustrated in FIG. 1. Furthermore, the operation of the image encoding apparatus according to the present invention is similar to that illustrated in the flow charts in FIG. 2, FIG. 3, and FIG. 4 according to the first embodiment, and thus a further description thereof is omitted.

In the present embodiment, evaluation values $S_1$ and $S_2$ and corresponding threshold value arrays $T_1$ and $T_2$ are similar to those according to the first embodiment. However, the present embodiment is different from the first embodiment in that the number of regions defining the block attribute classes used in discriminating the block of interest is not 72 but 13 (regions $R_1, R_2, \ldots, R_{13}$).

In the present embodiment, some regions defined by threshold value arrays $T_1$ and $T_2$ in FIG. 7 according to the first embodiment are unified into a smaller number of greater regions, and the block of interest is discriminated simply by making comparison with the threshold values, which results, in most cases, in a reduction in processing load compared with the first embodiment. More specifically, in the first embodiment, the comparison is performed up to 72 times to discriminate the block of interest into one of 72 regions. On the other hand, in the present embodiment, as illustrated in FIG. 10, the comparison is performed up to only 13 times to discriminate the block of interest by performing the comparison sequentially with $R_1, R_2, \ldots, R_{13}$ in this order. In the present embodiment, some regions are unified into a total of 13 greater regions, but the total number of groups is not limited to 13. Conversely, the number of regions may be increased to make it possible to control the image quality more finely.

Sixth Embodiment

In the previous embodiments, it is assumed that the processing units illustrated in FIG. 1 and FIG. 8 are realized by hardware. Alternatively, the processing units illustrated in FIG. 1 and FIG. 8 may be realized by a computer program.

Figure 14:
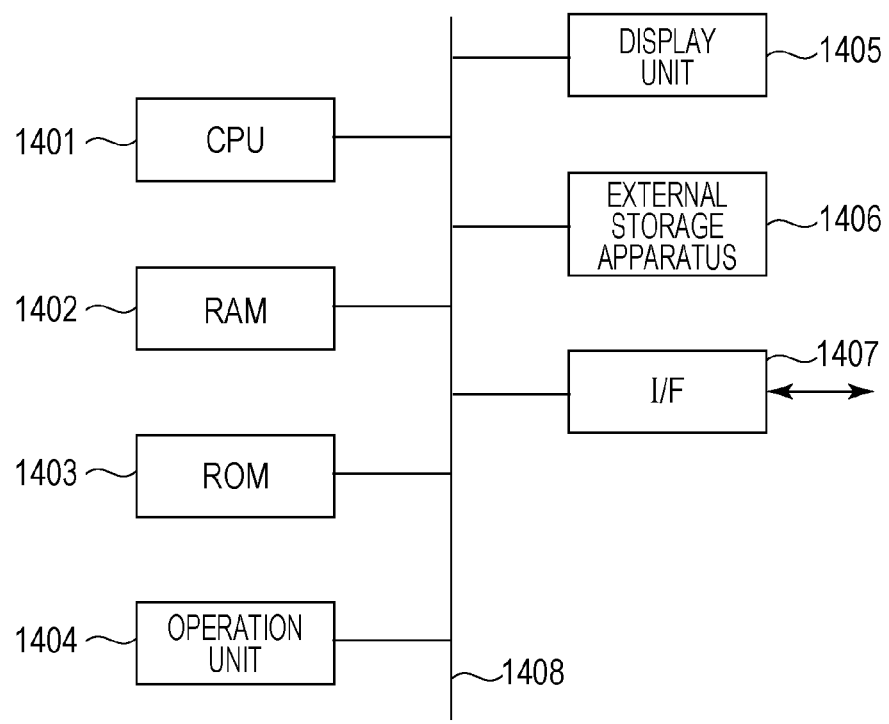
FIG. 14 is a diagram illustrating an example of a hardware configuration of a computer usable as an image encoding apparatus according to embodiments.

FIG. 14 is a block diagram illustrating an example of a hardware configuration of a computer usable as an image encoding apparatus according to one of the embodiments described above. A CPU 1401 performs overall control of the computer using a computer program and data stored in a RAM 1402 or a ROM 1403 and executes the processes of the image processing apparatus according to one of the embodiments described above. That is, the CPU 1401 functions as the processing units illustrated in FIG. 1 or FIG. 8.

The RAM 1402 has a storage area for temporarily storing the computer program or data loaded from an external storage device 1406, data acquired from the outside via an interface (I/F) 1407, and the like. The RAM 1402 also includes a work area used by the CPU 1401 in executing various processes. The RAM 1402 may provide a frame memory, other various areas as may be required. In the ROM 1403, setting data, a boot program, and the like associated with the computer are stored. An operation unit 1404 includes a keyboard, a mouse, and the like, and is used by a user of the computer to input various commands to the CPU 1401. A display unit 1405 outputs a result of the process performed by the CPU 1401. The display unit 1405 may be a display apparatus such as a liquid crystal display. The external storage device 1406 is a high-capacity information storage apparatus typified by a hard disk drive. In the external storage device 1406, an operating system (OS), the computer program for allowing the CPU 1401 to realize the functions illustrated in FIG. 1 or FIG. 8, and the like are stored. The external storage device 1406 may be used as a storage apparatus for storing various types of image data to be processed and/or encoded data output as a result of the process. The computer program, the data, or the like stored in the external storage device 1406 may be loaded into the RAM 1402 under the control of the CPU 1401 and processed by the CPU 1401. The I/F 1407 may be connected to a network such as a LAN, the Internet, or the like, various apparatuses such as a projection apparatus, a display apparatus, and the like such that the computer is allowed to input or output various kinds information via the I/F 1407. The units described above are connected to each other via a bus 1408. Part or all of the operations described above is mainly controlled by the CPU 1401 according to the flow charts illustrated in FIG. 2, FIG. 3, FIG. 4, and/or FIG. 13 thereby realizing part or all of the functions described above.

The embodiments make it possible to reduce the amount of code for blocks where visual degradation is not easily susceptible while assigning a large amount of code to blocks sensitive to degradation so as to improve visually perceptible image quality. The discrimination on the sub-block level may not be performed for all blocks, and thus it is possible to reduce the calculation processing load and suppress the increase in the number of blocks that are treated so as to achieve high image quality.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-124593 filed Jun. 13, 2013 which is hereby incorporated by reference herein in its entirety.

What is claimed is:

1. An image processing apparatus comprising:
an evaluation unit configured to determine a first evaluation value based on image data corresponding to a block in an image frame and determine a plurality of second evaluation values each being determined based on image data corresponding to a respective one of a plurality of sub-blocks divided from the block, wherein each of the plurality of second evaluations is obtained based on values of pixels belonging to the corresponding sub-block and indicates a complexity level of values of pixels belonging to the corresponding sub-block; and
a determination unit configured to determine magnitude of a quantization parameter for use in quantizing the image data corresponding to the block based on the first evaluation value determined by the evaluation unit and a smallest second evaluation value among the second evaluation values,
wherein the determination unit determines the quantization parameter for use in quantizing the image data corresponding to the block as a first quantization parameter in a case where the first evaluation values are a first value and the smallest second evaluation value is a second value, and
wherein the determination unit determines the quantization parameter for use in quantizing the image data corresponding to the block as a second quantization parameter smaller than the first quantization parameter in a case where the first evaluation values are the first value and the smallest second evaluation value is a third value smaller than the second value.

2. The image processing apparatus according to claim 1, wherein the evaluation unit is configured to determine the first evaluation value based on the sum of differences between a mean value of luminance of a plurality of pixels belonging to the block and luminance of each of the plurality of pixels belonging to the block.

3. The image processing apparatus according to claim 1, wherein the evaluation unit is configured to determine the first evaluation value based on a first evaluation parameter and a second evaluation parameter, the first evaluation parameter being determined based on a mean value of luminance of a plurality of pixels belonging to the block, and the second evaluation parameter is determined based on the sum of differences between luminance of each of the plurality of pixels belonging to the block and the mean value.

4. The image processing apparatus according to claim 1, further comprising a condition judgment unit configured to judge whether the first evaluation value satisfies a first condition, and judge whether the plurality of second evaluation values each corresponding to the respective one of the plurality of sub-blocks divided from the block each satisfy a second condition, wherein the determination unit is further configured to determine the magnitude of the quantization parameter of each of the plurality of sub-blocks divided from the block satisfying the first condition such that image data of a first sub-block satisfying the second condition is encoded based on a quantization parameter larger than a quantization parameter of a second sub-block not satisfying the second condition.

5. The image processing apparatus according to claim 1, further comprising:
a size acquisition unit configured to acquire size information associated with a display unit configured to display an image based on the image data, and
a sub-block determination unit configured to determine a size of the plurality of sub-blocks into which the block is divided based on the size information such that in a case where the size information acquired by the size acquisition unit indicates a smaller size than a predetermined size, the number of sub-blocks into which the block is divided is greater than the number of sub-blocks in a case where the size information acquired by the size acquisition unit indicates the predetermined size.

6. The image processing apparatus according to claim 1, wherein the evaluation unit is configured to determine each of the plurality of second evaluation values based on image data corresponding to respective one of the plurality of the sub-blocks in a case where the first evaluation value of the block satisfies a predetermined condition, and not to determine the plurality of second evaluation values of the plurality of sub-blocks of the block in a case where the first evaluation value does not satisfy the predetermined condition.

7. The image processing apparatus according to claim 1, wherein the plurality of sub-blocks includes N sub-blocks divided from the block and wherein the evaluation unit is configured to determine the first evaluation value such that an evaluation value of a block is the smallest evaluation value of evaluation values of respective M sub-blocks divided from the block, and M is an integer equal to or greater than 2, and N is an integer greater than M.

8. An image processing method comprising:
determining a first evaluation value based on image data corresponding to a block in an image frame and determine a plurality of second evaluation values each being determined based on image data corresponding to a respective one of a plurality of sub-blocks divided from the block, wherein each of the plurality of the second values is obtained based on values of pixels belonging to the corresponding sub-block and indicates a complexity level of the values of pixels belonging to the corresponding sub-block;
determining which one of the plurality of second evaluation values is a smallest second evaluation value; and
determining a magnitude of a quantization parameter for use in quantizing the image data corresponding to the block based on the first evaluation value and the smallest second evaluation among the plurality of second evaluation values;
wherein the quantization parameter is determined for use in quantizing the image data corresponding to the block as a first quantization parameter in a case where the first evaluation values are a first value and the smallest evaluation values is a second value; and the quantization parameter is determined for use in quantizing the image data corresponding to the block as a second quantization parameter smaller than the first quantization parameter in a case where the first evaluation values are the first value and the smallest second evaluation values is a third value smaller than the second value.

9. The image processing method according to claim 8, wherein the determining the first evaluation value is based on the sum of differences between a mean value of luminance of a plurality of pixels belonging to the block and luminance of each of the plurality of pixels belonging to the block.

10. The image processing method according to claim 8, wherein the determining the first evaluation value is based on a first evaluation parameter and a second evaluation parameter, the first evaluation parameter being determined based on a mean value of luminance of a plurality of pixels belonging to the block, and the second evaluation parameter being determined based on the sum of differences between the luminance of each of the plurality of pixels belonging to the block and the mean value.

11. The image processing method according to claim 8, further comprising judging whether the first evaluation value satisfies a first condition and judging whether the plurality of second evaluation values each being determined corresponding to the respective one of the plurality of sub-blocks divided from the block each satisfy a second condition, wherein the determining the magnitude of quantization parameter includes determining the encoding parameter of each of the plurality of sub-blocks divided from the block satisfying the first condition such that image data of a first sub-block satisfying the second condition is encoded based on a quantization parameter larger than a quantization parameter of a second sub-block among the plurality of sub-blocks not satisfying the second condition.

12. The image processing method according to claim 8, further comprising acquiring size information associated with a display unit configured to display an image based on the image data, and determining a size of the plurality of sub-blocks into which the block is divided based on the size information such that in a case where the acquired size information indicates a smaller size than a predetermined size, the number of sub-blocks into which the block is divided is greater than the number of sub-blocks in a case where the acquired size information indicates the predetermined size.

13. The image processing method according to claim 8, wherein in the determining the second evaluation values based on the image data corresponding to the respective ones of the plurality of sub-blocks in a case where the first evaluation value satisfies a predetermined condition, and not determined the plurality of second evaluation values of the plurality of sub-blocks of the block in a case where the first evaluation value does not satisfy the predetermined condition.

14. The image processing method according to claim 8, wherein the plurality of sub-blocks includes N sub-blocks divided from the block and the method further comprising determining the first evaluation value such that an evaluation value of the block is the smallest evaluation value of evaluation values of respective M sub-blocks divided from the block, wherein M is an integer equal to or greater than 2, and N is an integer greater than M.

15. A non-transitory storage medium storing a computer-readable program, the program comprising:

determining a first evaluation value based on image data corresponding to a block in an image frame and determining a plurality of second evaluation values, each being determined based on pieces of image data corresponding to a respective one of a plurality of sub-blocks divided from the block, wherein each of the plurality of second evaluation values is obtained based on values of pixels belonging to the corresponding sub-block and indicates a complexity level of the values of pixels belonging to the corresponding sub-block; and determining a magnitude of a quantization parameter for use in quantizing the image data corresponding to the block based on the determined first evaluation value and a smallest second evaluation among the plurality of second evaluation values, wherein the quantization parameter is determined for use in quantizing the image data corresponding to the block as a first quantization parameter in a case where the first evaluation values are a first value and the smallest evaluation values is a second value; and the quantization parameter is determined for use in quantizing the image data corresponding to the block as a second quantization parameter smaller than the first quantization parameter in a case where the first evaluation values are the first value and the smallest second evaluation values is a third value smaller than the second value.

16. The non-transitory storage medium according to claim 15, wherein the determining the first evaluation value is based on the sum of differences between a mean value of luminance of a plurality of pixels belonging to the block and luminance of each of the plurality of pixels belonging to the block.

17. The non-transitory storage medium according to claim 15, wherein the determining the first evaluation value is based on a first evaluation parameter and a second evaluation parameter, the first evaluation parameter being determined based on a mean value of luminance of a plurality of pixels belonging to the block, and the second evaluation parameter being determined based on the sum of differences between the luminance of each of the plurality of pixels belonging to the block and the mean value.

18. The non-transitory storage medium according to claim 15, the program further comprising judging whether the first evaluation value satisfies a first condition and judging whether the plurality of second evaluation values each corresponding to the respective one of the plurality of sub-blocks divided from the block each satisfy a second condition, wherein the determining the magnitude quantization parameter includes determining the quantization parameter of each of the plurality of sub-blocks divided from the block satisfying the first condition such that image data of a first sub-block satisfying the second condition is encoded based on a quantization parameter larger than a quantization parameter of a second sub-block among the plurality of sub-blocks not satisfying the second condition.

19. The non-transitory storage medium according to claim 15, the program further comprising acquiring size information associated with a display unit configured to display an image based on the image data, and determining a size of the plurality of sub-blocks into which the block is divided based on the size information such that in a case where the acquired size information indicates a smaller size than a predetermined size, the number of sub-blocks into which the block is divided is greater than the number of sub-blocks in a case where the acquired size information indicates the predetermined size.

20. The non-transitory storage medium according to claim 15, wherein in the determining the plurality of second evaluation values is determined based on the image data corresponding to the respective ones of the plurality of sub-blocks in a case where the first evaluation satisfies a predetermined condition, and the second evaluation values of plurality of sub-blocks of the block in a case where the first evaluation value does not satisfy the predetermined condition.

21. The non-transitory storage medium according to claim 15, wherein the plurality of sub-blocks includes N-sub-blocks divided from the block, in the determining the first evaluation value such that the first evaluation value is the smallest evaluation value of evaluation values of respective M sub-blocks divided from the block, wherein M is an integer equal to or greater than 2, and N is an integer greater than M.

22. The image processing apparatus according to claim 7, wherein the determination unit determines, based on each of the plurality of second evaluation values for a corresponding one of the N sub-blocks divided from the block, the magnitude of the quantization parameter for use in quantizing the image data corresponding to the block.

23. The image processing apparatus according to claim 1, wherein the first evaluation value is an evaluation value indicating luminance in the block.

24. The image processing apparatus according to claim 1, wherein the first evaluation value is at least any of a sum of differences between luminance of each of a plurality of pixels belonging to the block and a mean value of luminance of the plurality of pixels belonging to the block, a sum of variance of the luminance, variance of color difference of the plurality of pixels belonging to the block, and a mean value of the color difference values of the plurality of pixels belong to the block.

25. The image processing method according to claim 8, wherein the first evaluation value is an evaluation value indicating luminance in the block.

26. The image processing method according to claim 8, wherein the first evaluation value is at least any one of the sum of difference between luminance of each of a plurality of pixels belonging to the block and a mean value of luminance of the plurality of pixels belonging to the block, variance of the luminance, variance of color difference values of the plurality of pixels belonging to the block, and a mean value of the color difference values of the plurality of pixels belong to the block.

27. The non-transitory storage medium according to claim 15, wherein the first evaluation value is an evaluation value indicating luminance in the block.

28. The non-transitory storage medium according to claim 15, wherein the first evaluation value is at least one of the sum of differences between luminance of each of a plurality of pixels belonging to the block and a mean value of luminance of the plurality of pixels belong to the block, variance of the luminance, variance of color difference values of the plurality of pixels belonging to the block, and a mean value of the color difference values of the plurality of pixels belonging to the block.

29. The image processing method according to claim 15, wherein in a case where the smallest second evaluation values is a first value, determining the quantization parameter used in quantizing the image data corresponding to the block as a first quantizing parameter, in a case where the smallest second evaluation value is smaller than the first value, determining the quantization parameter used for quantizing the image data corresponding to the block as a second quantization parameter smaller than the first quantization parameter.

30. The image processing apparatus according to claim 1, wherein each of the plurality of second evaluation values is at least any one of the sum of differences between luminance of each of a plurality of pixels belonging to the corresponding sub-block and a mean value of luminance of the plurality of pixels belonging to the corresponding sub-block, variance of the luminance, variance of the luminance values, variance of color difference values of the plurality of pixels belonging to the corresponding sub-block, and a mean value of color difference values of the plurality of pixels belonging to the corresponding sub-block.

* * * * *